(12) United States Patent
King

(10) Patent No.: US 6,857,222 B1
(45) Date of Patent: Feb. 22, 2005

(54) FISHING BAIT APPARATUS

(76) Inventor: Jason L. King, 2378 US Hwy. 12, SW. Lot #116, Montrose, MN (US) 55363

( * ) Notice: Subject to any disclaimer, the term of this patent is extended or adjusted under 35 U.S.C. 154(b) by 0 days.

(21) Appl. No.: 10/644,176

(22) Filed: Aug. 21, 2003

(51) Int. Cl.⁷ .......................... A01K 97/04; A01K 97/05
(52) U.S. Cl. .............................................. 43/56; 43/55
(58) Field of Search ................... 43/55, 56; 206/315.11

(56) References Cited

U.S. PATENT DOCUMENTS

| | | | | |
|---|---|---|---|---|
| 354,958 A | * | 12/1886 | Weightman | 43/56 |
| 713,890 A | * | 11/1902 | Koch | 43/56 |
| 769,874 A | * | 9/1904 | Paar | 43/56 |
| 2,560,054 A | * | 7/1951 | Wells | 43/55 |
| 3,000,132 A | * | 9/1961 | Koistinen | 43/56 |
| 3,344,552 A | * | 10/1967 | Glasco | 43/56 |
| 3,499,244 A | * | 3/1970 | Malone | 43/56 |
| 3,717,124 A | * | 2/1973 | Jacobs | 119/223 |
| 3,955,306 A | * | 5/1976 | Handa | 43/56 |
| 5,109,625 A | * | 5/1992 | Skrede | 43/56 |

* cited by examiner

*Primary Examiner*—Kurt Rowan

(57) ABSTRACT

A fishing bait apparatus for providing a hands-free method of separating minnows according to size. The fishing bait apparatus includes a container having side, upper and lower walls, and also having an open top; and also includes a lid assembly including a lid member being hingedly attached to the container and also including lid support members for supporting the lid member in an open position; and further includes a handle assembly including a handle being pivotally attached to the container; and also includes bait storage members being disposed in the container and upon the upper wall.

7 Claims, 5 Drawing Sheets

FISHING BAIT APPARATUS

BACKGROUND OF THE INVENTION

1. Field of the Invention

The present invention relates to fishing bait holders and more particularly pertains to a new fishing bait apparatus for providing a hands-free method of separating minnows according to size.

2. Description of the Prior Art

The use of fishing bait holders is known in the prior art. More specifically, fishing bait holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,109,625; U.S. Pat. No. 2,651,137; U.S. Pat. No. 5,499,473; U.S. Pat. No. 5,228,231; U.S. Pat. No. 4,462,180; and U.S. Patent No. Des. 163,697.

While these devices fulfill their respective, particular objectives and requirements, the aforementioned patents do not disclose a new fishing bait apparatus. The prior art includes bait buckets having holes through walls thereof for aerating the bait contained therein.

SUMMARY OF THE INVENTION

The general purpose of the present invention, which will be described subsequently in greater detail, is to provide a new fishing bait apparatus which has many of the advantages of the fishing bait holders mentioned heretofore and many novel features that result in a new fishing bait apparatus which is not anticipated, rendered obvious, suggested, or even implied by any of the prior art fishing bait holders, either alone or in any combination thereof. The present invention includes a container having side, upper and lower walls, and also having an open top; and also includes a lid assembly including a lid member being hingedly attached to the container and also including lid support members for supporting the lid member in an open position; and further includes a handle assembly including a handle being pivotally attached to the container; and also includes bait storage members being disposed in the container and upon the upper wall. None of the prior art includes the combination of the elements of the present invention.

There has thus been outlined, rather broadly, the more important features of the fishing bait apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new fishing bait apparatus which has many of the advantages of the fishing bait holders mentioned heretofore and many novel features that result in a new fishing bait apparatus which is not anticipated, rendered obvious, suggested, or even implied by any of the prior art fishing bait holders, either alone or in any combination thereof.

Still another object of the present invention is to provide a new fishing bait apparatus for providing a hands-free method of separating minnows according to size.

Still yet another object of the present invention is to provide a new fishing bait apparatus that is easy and convenient to use.

Even still another object of the present invention is to provide a new fishing bait apparatus that can easily move minnows from one storage member to the next by simply opening and closing the gate members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
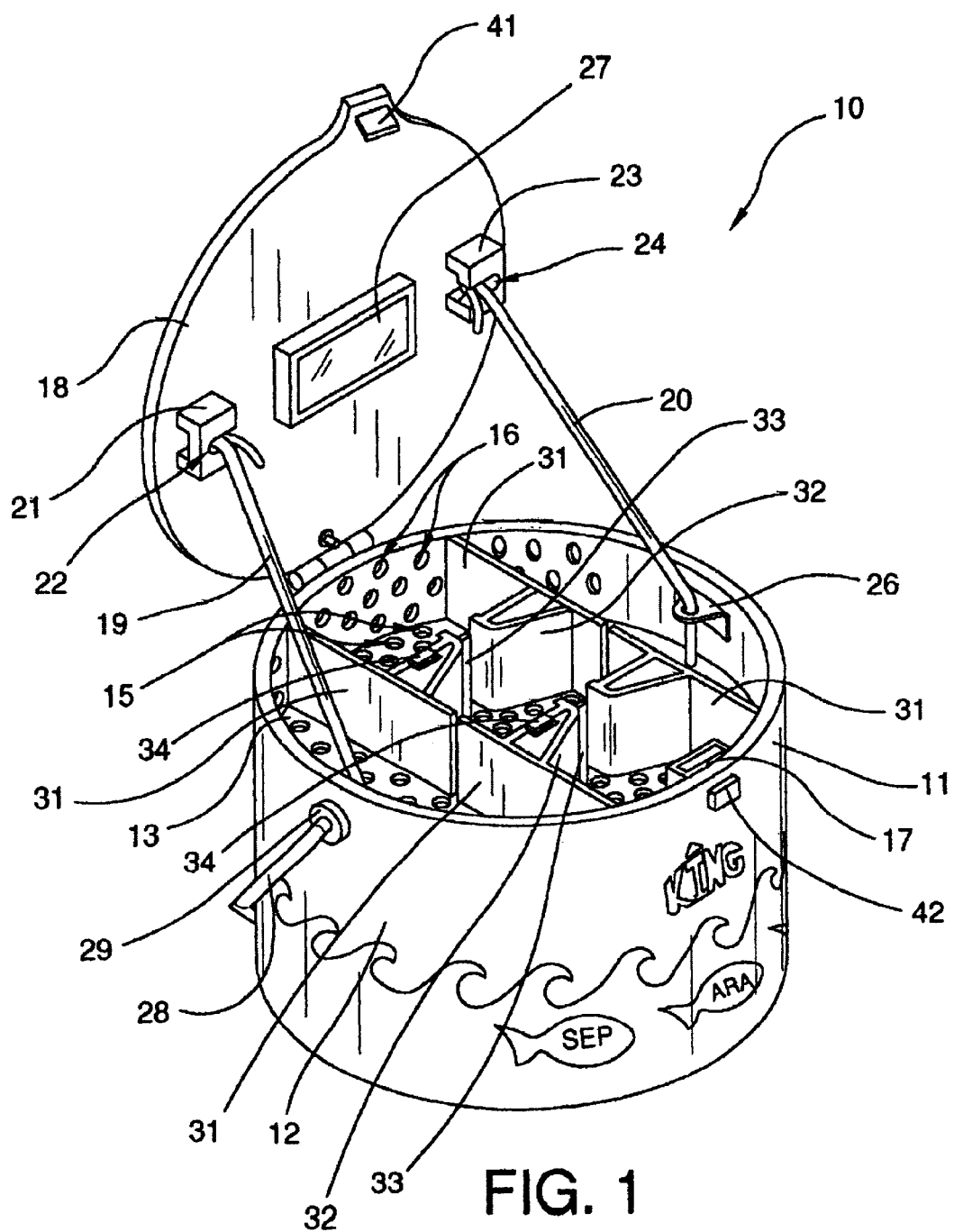
FIG. 1 is a perspective view of a new fishing bait apparatus according to the present invention.
Figure 2:
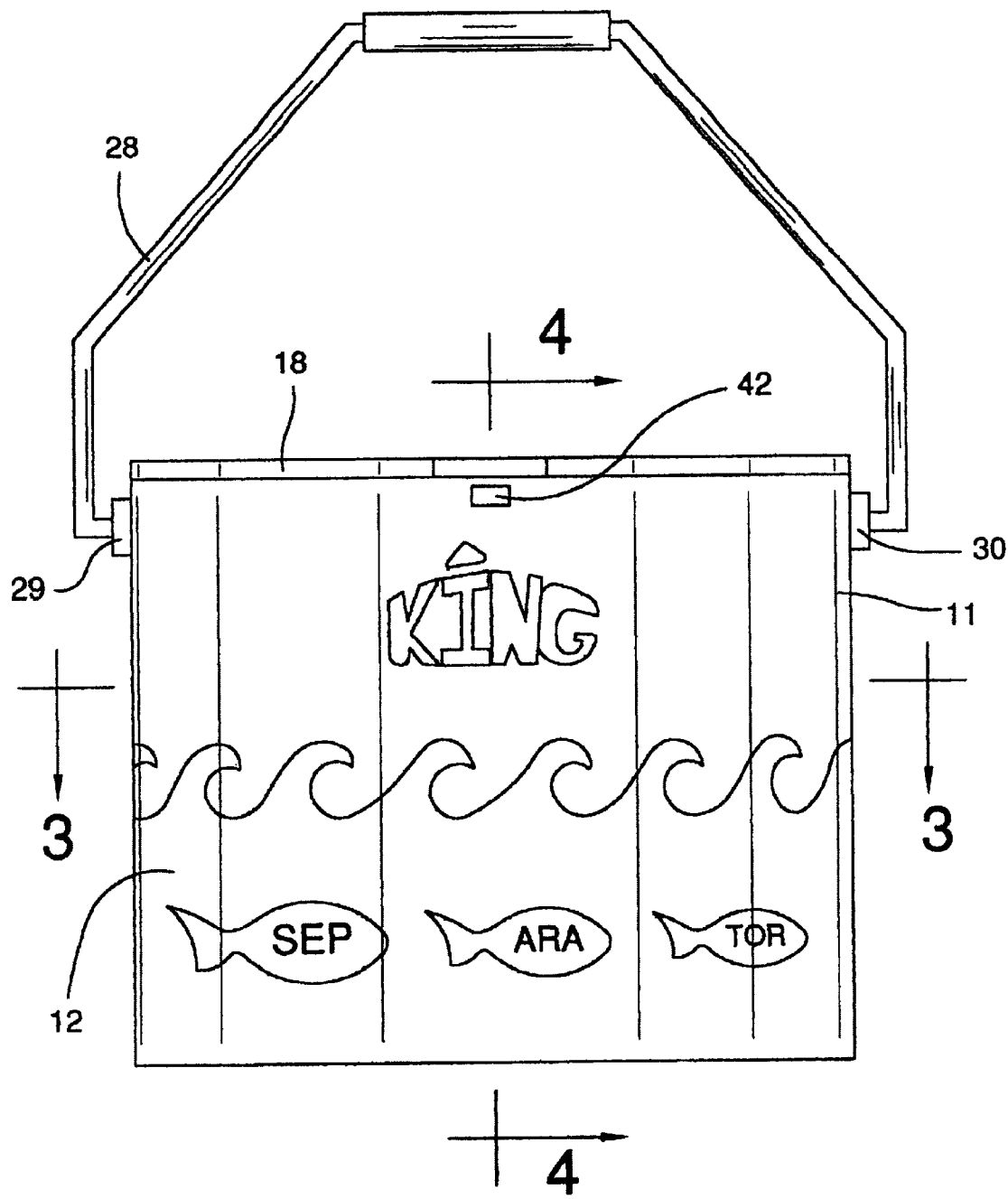
FIG. 2 is a side elevational view of the present invention.
Figure 3:
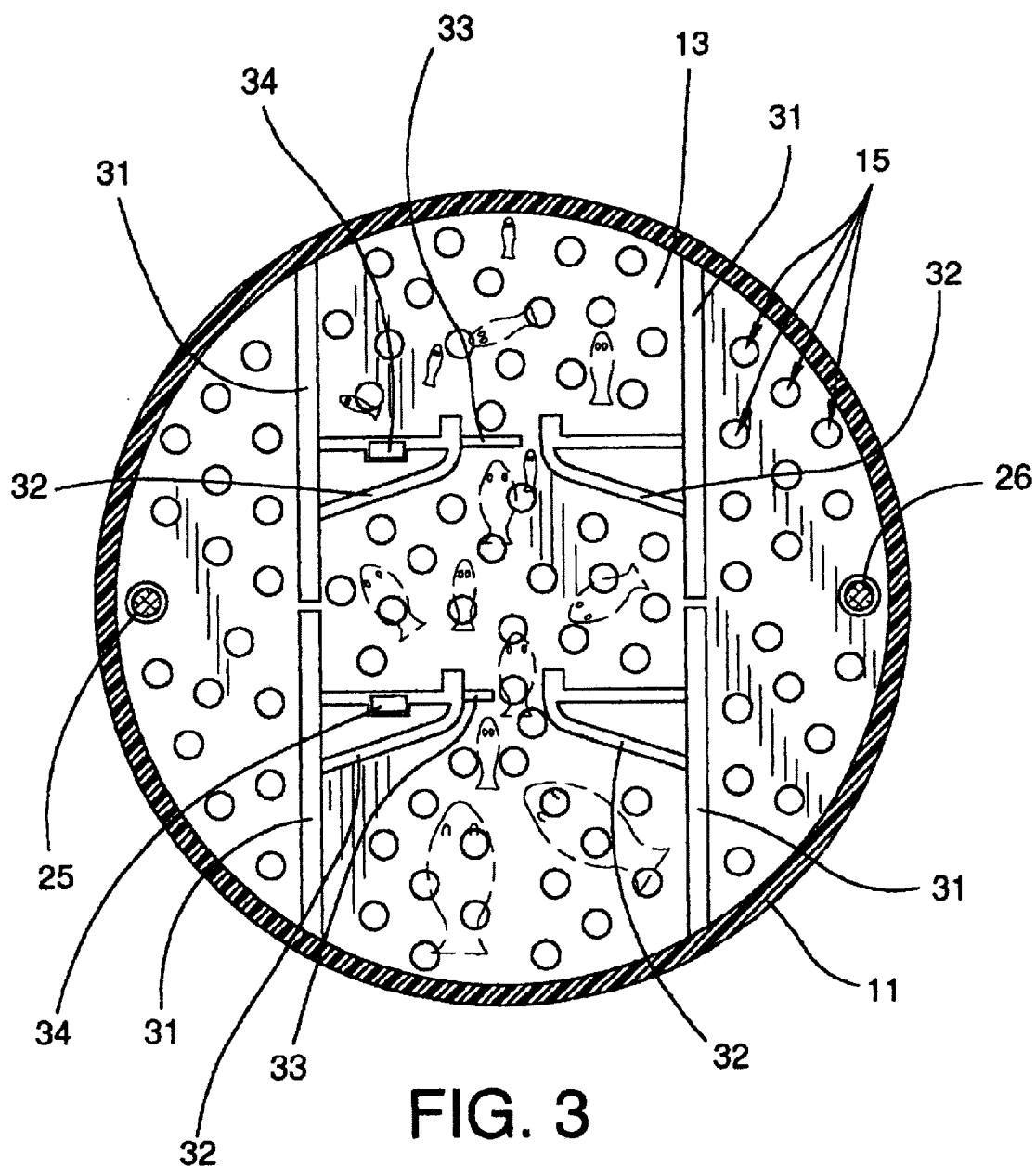
FIG. 3 is a top plan view of the present invention.
Figure 4:
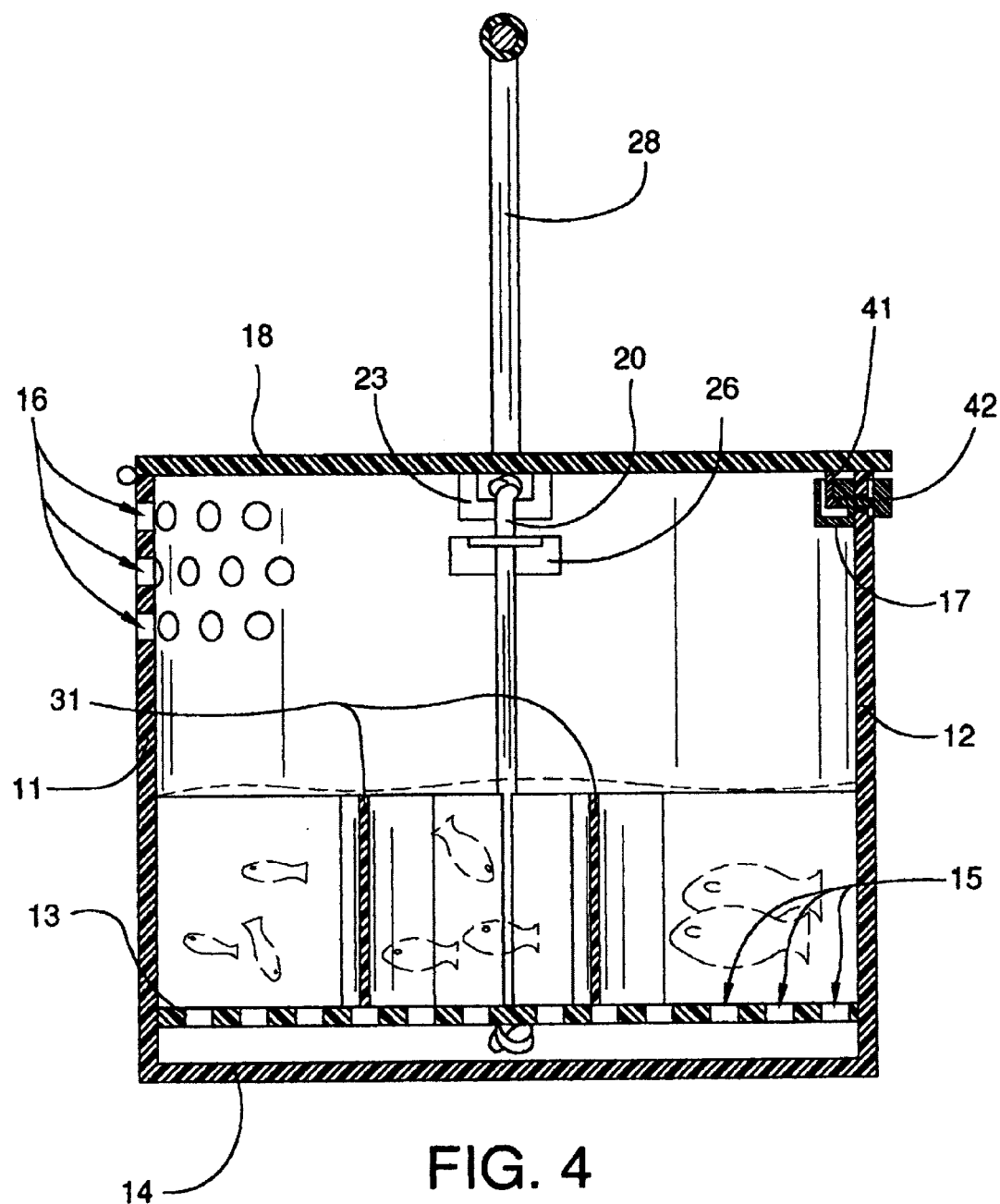
FIG. 4 is a cross-sectional view of the present invention.
Figure 5:
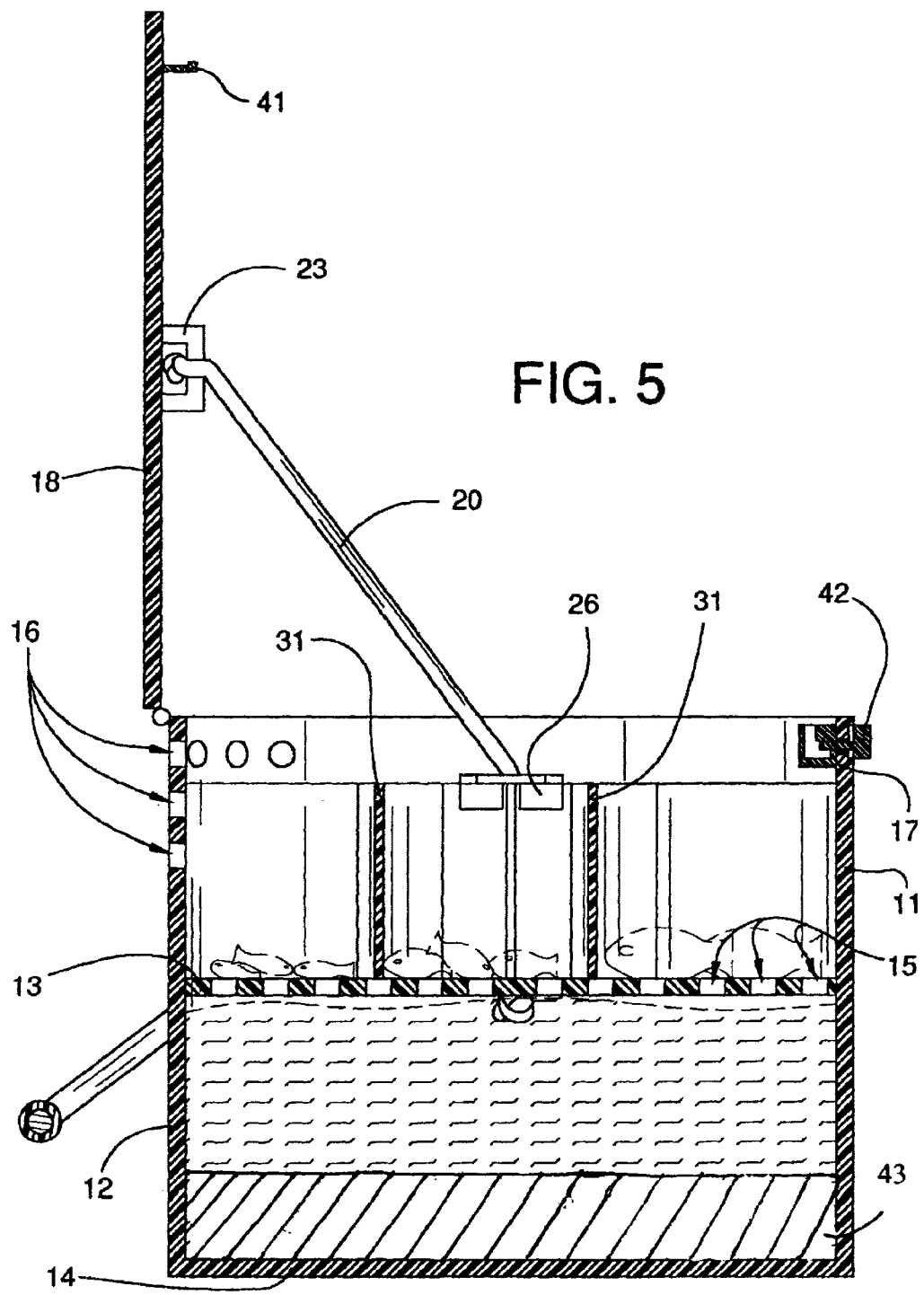
FIG. 5 is another cross-sectional view of the present invention.

With reference now to the drawings, and in particular to FIGS. 1 through 5 thereof, a new fishing bait apparatus embodying the principles and concepts of the present invention and generally designated by the reference numeral 10 will be described.

As best illustrated in FIGS. 1 through 5, the fishing bait apparatus 10 generally comprises a container 11 having side, upper and lower walls 12–14, and also having an open top. The upper wall 13 has a plurality of holes 15 being disposed therethrough and is spaced generally parallel above the bottom wall 14 thus forming a water compartment between the upper and lower walls 13,14. The container also includes air holes being disposed through a portion of the side wall 12 above the upper wall 13 of the container 11.

A lid assembly includes a lid member 18 being hingedly and securely attached to the container 11 and also includes lid support members 19,20 for supporting the lid member 18 in an open position. The lid assembly further includes brackets 21,23 being securely attached to an underside of the lid member 18 and having slots 22,24 disposed therein, and also includes eyelets 25,26 being securely attached to the inners side of the side wall 12, and also includes a catch mechanism being securely attached to the side wall 12 near a top edge thereof and having a housing 17 with an opening therein and also having a spring-loaded catch 42 being biasedly disposed through the side wall 12 of the container 11 and in the housing 17. The lid assembly further includes a latch 41 being securely attached to the underside of the lid member 18 and being removably received and engaged by the spring-loaded catch 42 in the housing 17 for latching the lid member upon the open top of the container 11. The lid support members 19,20 are strings each having a first end portion which is conventionally connected to a respective bracket 21,23, and also being strung through a respective eyelet 25,26. The lid assembly also includes a battery-operated light-emitting member 27 being securely attached to the underside of the lid member 18.

A handle assembly includes a handle 28 being pivotally and securely attached to the container 11. The handle assembly includes a pair of disc-shaped handle retainers 29,30 being securely attached to an outer side of the side wall 12 of the container 11 and having axially-extended bores disposed therein. The handle 28 includes end portions which are securely disposed in the axially-extended bores of the disc-shaped handle retainers 29,30.

Bait storage members are disposed in the container 11 and upon the upper wall 13. The bait storage members include a plurality of partitions 31 being disposed upon the upper wall 13 in the container 11, and also include a plurality of gate support members 32 being securely attached to the partitions 31, and further include gate members 33 being slidably supported by the gate support members 32 for forming bait storage compartments upon the upper wall 13 in the container 11, and also include tab members 34 being securely attached to the gate members 33 for retaining the gate members 33 in open positions. As a second embodiment, the bait storage members include cylindrical members 35 being securely disposed side-by side and having openings 36 being disposed through the walls thereof, and also include gates support members 32 being securely attached to the cylindrical members 35, and further include gate members 33 being supported by the gate support members 32 and being closeable over the openings 36 of the cylindrical members 35. The bait storage members also include boxes 37 being removably disposed upon the upper wall 13 of the container 11 for storing worms, and further include covers 38 being removably disposed upon the boxes 37 and having venting holes 39 being disposed therethrough, and also include tubular air inlets 40 being securely disposed in side walls of the boxes 37 for allowing air to vent into the boxes 37.

A floatation member 43 being preferably made of Styrofoam material is securely and conventionally attached to the lower wall 14 in the container 11 for floating the container 11 upside down.

In use, the user puts water into the container 11, and also puts live bait such as minnows upon the upper wall 13, and sorts the minnows according to size in the various compartments formed by the partitions 31 and separated by the gate members 33.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the fishing bait apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing bait apparatus comprising:

a container having side, upper and lower walls, said upper wall having a plurality of holes being disposed therethrough and being spaced generally parallel above said bottom wall thus forming a water compartment between said upper and lower walls, said container also including air holes being disposed through a portion of said side wall above said upper wall of said container;

a lid assembly including a lid member being hingedly attached to said container and also including lid support members for supporting said lid member in an open position, said lid assembly further includes including brackets being attached to an underside of said lid member and having slots therein, and also including eyelets being attached to said inners side of said side wall, and further including a catch mechanism being securely attached to said side wall near a top edge thereof and having a housing with an opening therein and also having a spring-loaded catch being biasedly disposed through said side wall of said container and in said housing, and also including a latch being attached to said underside of said lid member and being removably received and engaged by said catch in said housing for latching said lid member upon said container;

a handle assembly including a handle being pivotally attached to said container;

bait storage members being disposed in said container and upon said upper wall; and a floatation member being disposed in said container for floating said container upside down.

2. The fishing bait apparatus as described in claim 1, wherein said lid support members are strings each having a first end portion which is connected to a respective said bracket, and also being strung through a respective said eyelet.

3. The fishing bait apparatus as described in claim 2, wherein said lid assembly also includes a battery-operated light-emitting member being attached to said underside of said lid member.

4. The fishing bait apparatus as described in claim 2, wherein said handle assembly includes a pair of disc-shaped handle retainers being attached to an outer side of said side wall of said container and having axially-extended bores disposed therein.

5. The fishing bait apparatus as described in claim 2, wherein said bait storage members includes a plurality of partitions being disposed upon said upper wall in said container, and also includes a plurality of gate support members being attached to said partitions, and further includes gate members being slidably supported by said gate support members for forming bait storage compartments upon said upper wall in said container, and also includes tab members being attached to said gate members for retaining said gate members in open positions.

6. The fishing bait apparatus as described in claim 2, wherein said bait storage members include cylindrical members being disposed side-by side and having openings being disposed through said walls thereof, and also include gates support members being attached to said cylindrical members, and further include gate members being support by said gate support members and being closeable over said openings of said cylindrical members.

7. The fishing bait apparatus as described in claim 6, wherein said bait storage members also include boxes being removably disposed upon said upper wall of said container for storing worms, and further include covers being removably disposed upon said boxes and having venting holes being disposed therethrough, and also include tubular air inlets being disposed in side walls of said boxes for allowing air to vent into said boxes.

* * * * *